United States Patent
Iseki et al.

(10) Patent No.: US 6,698,790 B2
(45) Date of Patent: Mar. 2, 2004

(54) AIR BELT FOR INFLATABLE SEAT BELT DEVICE

(75) Inventors: Hideo Iseki, Sakata-gun (JP); Kiyotaka Ohhashi, Sakata-gun (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/013,715

(22) Filed: Dec. 13, 2001

(65) Prior Publication Data

US 2002/0074783 A1 Jun. 20, 2002

(30) Foreign Application Priority Data

Dec. 14, 2000 (JP) ........................................ 2000-380323

(51) Int. Cl.[7] .............................................. B60R 21/18
(52) U.S. Cl. .................................... 280/733; 280/801.1
(58) Field of Search .............................. 280/733, 801.1, 280/808, 743.1

(56) References Cited

U.S. PATENT DOCUMENTS

| | | | |
|---|---|---|---|
| 5,100,713 A | * 3/1992 | Homma et al. | 139/383 R |
| 5,354,096 A | 10/1994 | Tanaka et al. | 280/733 |
| 5,390,953 A | * 2/1995 | Tanaka et al. | 280/733 |
| 6,145,879 A | * 11/2000 | Lowe et al. | 280/743.1 |

FOREIGN PATENT DOCUMENTS

JP          10102348 A   *  4/1998   ............ D03D/1/00

* cited by examiner

*Primary Examiner*—Paul N. Dickson
*Assistant Examiner*—Faye M. Fleming
(74) *Attorney, Agent, or Firm*—Foley & Lardner

(57) ABSTRACT

An air belt that includes a bag-shaped mesh webbing, a bag inserted into the mesh webbing, and a tube shaped mesh cover which covers the mesh webbing. The mesh cover includes warp yarn, weft yarn, and an connected part formed by connecting the weft yarn with an entanglement-thread at a hem. The entanglement-thread of the connected part breaks due the force of the bag expanding so that the bag and the mesh webbing expand further than the cover. The thickness of the cover is uniform across its width, resulting in a uniform bending strength of the mesh cover between the left and right hems and providing comfort to the wearer.

12 Claims, 5 Drawing Sheets

AIR BELT FOR INFLATABLE SEAT BELT DEVICE

BACKGROUND OF THE INVENTION

The present invention relates to inflatable seat belt devices provided with air belts. Air belts typically include an inflatable bag which may be inflated by gas produced in emergencies such as a vehicle collision. In particular, the present invention relates to an air belt for an inflatable seat belt device including at least a cover for covering a mesh webbing which expands together with the bag expanding with gas.

Conventional seat belt devices comprising webbing are generally installed in vehicles such as automobiles in emergencies such as a vehicle collision, thereby protecting the passengers from being injured due to the collision.

However, in such seat belt devices, since the width of the webbing for restraining the passengers may is relatively small, the passengers may receive relatively large loads.

Therefore, an inflatable seat belt device which includes an air belt has been proposed in, for example, Japanese Patent Application Publication No. 6-135293 (incorporated by reference herein), in which webbing is formed into a bag and shaped as a belt in order to serve as a general seat belt when not inflated. The bag-shaped webbing is inflated by introducing gas ejected by gas generating means into the bag-shaped webbing in an emergency. The inflated bag-shaped webbing receives the passenger. By using such an air belt for the inflatable seat belt device, the kinetic energy of the passenger is distributed over a larger area, thereby dispersing the load, whereby the load applied to the passenger becomes relatively small and the passenger is protected more effectively.

The webbing becomes shorter in the longitudinal direction and the thickness is increased when the webbing is inflated. As a result, the webbing presses against the passenger's body due to the increased thickness. Furthermore, the same effect as winding the webbing can be achieved. The inflating webbing provides an initial retaining force similar to that of a pretensioner.

Generally, the air belt disclosed in the above publication or an air belt 1 used in the inflatable seat belt device shown, for example, in FIGS. 5(a) and 5(b) includes bag-shaped webbing 2', a tube 3' which is made of an elastic material, such as urethane or silicone, capable of being formed relatively thin and having heat-resistance and relatively high strength and which is inserted into the webbing 2', and a tube-like cover 4 for covering the webbing 2' which is made of a resin, such as polyester.

The tube-like cover 4 is formed such that right and left hems 4a and 4b of a rectangular cloth overlapping each other are sewed on each other by a sewing thread 5a. In this case, the right and left hems 4a and 4b of the cloth are each folded toward the inside of the tube-shaped cloth and the folded parts are sewed together by the sewing thread 5a. Therefore, a sewed part 5 is positioned inside the tube-shaped cloth.

In the air belt 1 formed as described above, the webbing 2' expands when the tube 3' expands with gas introduced from an inflator (not shown). In this case, the sewing thread 5a of the sewed part 5 of the cover 4 breaks due to the expansive force of the webbing 2'. As a result, the cover 4 extends, and the webbing 2' and the tube 3' expand further.

However, because the cover 4 is provided with the right and left hems 4a and 4b which are folded at the sewed part 5, the thickness of the cover 4 is greater at the sewed part 5 than at the other parts of the cover 4. The thickness of the cover 4 is uneven in the width direction of the cover 4, thereby providing an uncomfortable sensation to the passenger using the seat belt.

The bending strength of the cover 4 in a direction perpendicular to the longitudinal direction of the belt increases due to the fold and sewing of the cloth. The bending strength differs between the hem 4c and a hem 4d opposite to the sewn part 5, thereby also providing the passenger with an uncomfortable sensation when applying or using the seat belt.

Moreover, when the air belt 1 passes through a guide hole of a belt guide for guiding the air belt 1 toward a passenger (an intermediate guide such as disclosed in the above-referenced publication), a problem occurs because it is difficult for the air belt 1 to smoothly slide through the guide hole because of the increased bending strength of the cover 4.

SUMMARY OF THE INVENTION

Accordingly, an object of the present invention is to provide an air belt for an inflatable seat belt device, which can be formed so that the thickness of the air belt is uniform in the width direction and the bending strength of the air belt is substantially the same between at the right hem and at the left hem of the air belt.

Another object of the present invention is to provide an air belt for an inflatable seat belt device, which includes a cover of which the bending strength is reduced to a lowest possible level, whereby the air belt can smoothly slide through a guide hole of a belt guide.

Therefore, an air belt for an inflatable seat belt device is provided according to the present invention. The air belt comprises a bag capable of expanding when gas is introduced into the bag; mesh webbing receiving the bag and capable of expanding according to the expansion of the bag; and a tube-like cover for covering the mesh webbing. The cover is formed with cloth which is woven with warp yarn and weft yarn and is formed into a tube by tangling and connecting the weft yarn at hems of the cloth with an entanglement-thread. The entanglement-thread breaks due to an expansive force produced when the mesh webbing expands, whereby the cover extends so that the mesh webbing expands further.

According to the present invention, a small-denier-warp region may be formed in a predetermined region of the belt. The small-denier-warp region may be on at least one side of the part of the cover that includes the entanglement-thread. The part of the cover that includes the entanglement-thread is formed by tangling the weft yarn with the entanglement thread. The small-denier-warp region being provided with a warp yarn having a denier smaller than that of the warp yarn disposed in a region other than the predetermined region.

When the mesh webbing of the air belt used in the inflatable seat belt according to the present invention expands according to the expansion of the bag by the gas supplied from the gas generating means in an emergency, the entanglement-thread of the tube-like cover breaks due to the expansive force.

The cover extends widely and the mesh webbing and the bag thereby fully expand quickly. The kinetic energy of the passenger is distributed over a larger area, thereby dispersing the load. As a result, the load applied to the passenger becomes relatively small and the passenger is protected more effectively, than in the case of the known air belt.

The cover is formed into a tube by tangling and connecting the weft yarn with the entanglement-thread. Therefore, the sewn part that increases the thickness and the bending strength provided in the known air belt can be eliminated.

The thickness of the cover of the air belt becomes more uniform in the width direction and the bending strength of the cover becomes substantially uniform between the right and left hems, thereby suppressing the uncomfortable sensation of the passenger and improving sensation during the usage of the belt.

Since the thickness and the bending strength of the cover are reduced by eliminating the sewn part, the air belt 1 can smoothly slide through the guide hole of the belt guide, and the belt can be wound and unwound smoothly. In particular, the air belt can be wound directly to a retractor because the thickness of the cover is reduced.

According to the present invention, the small-denier-warp region α may be provided in a predetermined region on at least one side of the entangled-connected part which is formed by tangling the weft yarn with the entanglement-thread. The cover of the air belt provides a soft sensation at a hem of the cover at the side of the entangled-connected part. Therefore, the passenger touches the hem of the cover with a comfortable soft sensation when the passenger applies the air belt in an ordinary seat belt state, thereby suppressing the uncomfortable sensation of the passenger and improving sensation during the usage of the belt.

According to the present invention, heat-fusion yarn may be used as at least one of the warp yarn and the weft yarn. With this arrangement, the heatfusion yarn adheres to the adjacent yarn when it melts, whereby the adjacent yarns and the yarns crossing each other adhere to each other, and the ravels of the yarn are not produced. In particular, when the heat-fusion yarn is used as the weft yarn and the warp yarn, the displacement of the warp yarn can be avoided. Displacement of the warp yarn is produced when the air belt in an ordinary non-expanded state is wound or unwound and slides on a belt guide which guides the air belt.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1A:
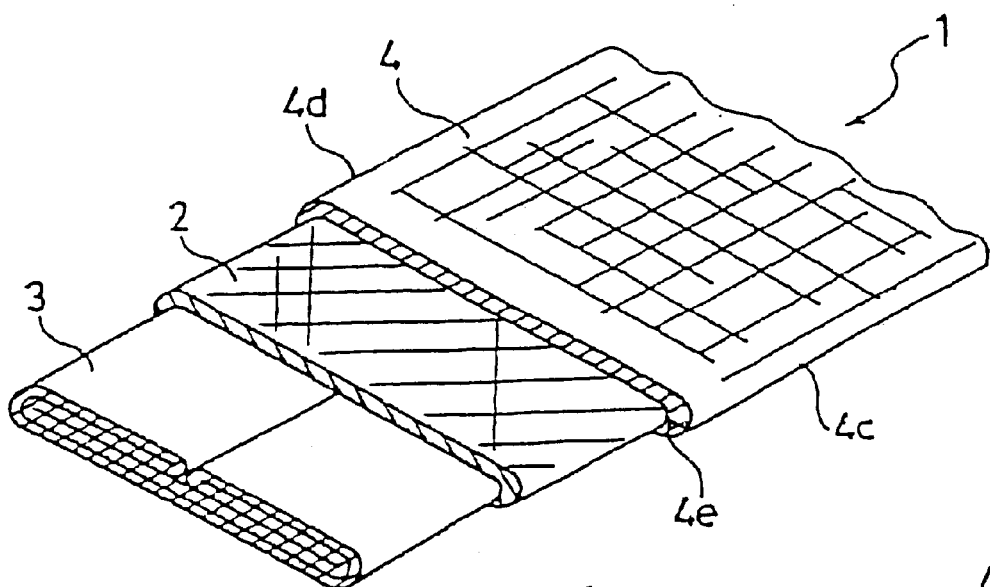
FIG. 1(a) is a perspective view of a part of an air belt for an inflatable seat belt device, according to an embodiment of the present invention.
Figure 1B:
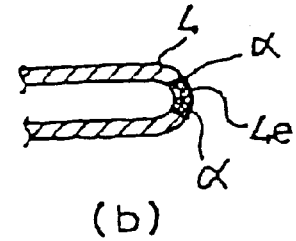
FIG. 1(b) is a partial cross-sectional view of a part of a hem of a cover of the air belt shown in view (a).

The same component parts of the air belt, according to the present invention, as those of the known air belt mentioned above are referred to by using the same reference numerals.

An air bag 1 shown in FIG. 1(a) includes bag-shaped mesh webbing 2, a bag 3 inserted into the mesh webbing 2, and a tube-like mesh cover 4 which covers the mesh webbing 2. The mesh webbing 2 and the bag 3 are individually made of the same materials as the materials for these component parts disclosed in the above-mentioned publication. The mesh webbing 2 and the bag 3 may be made of other materials.

Figure 2A:
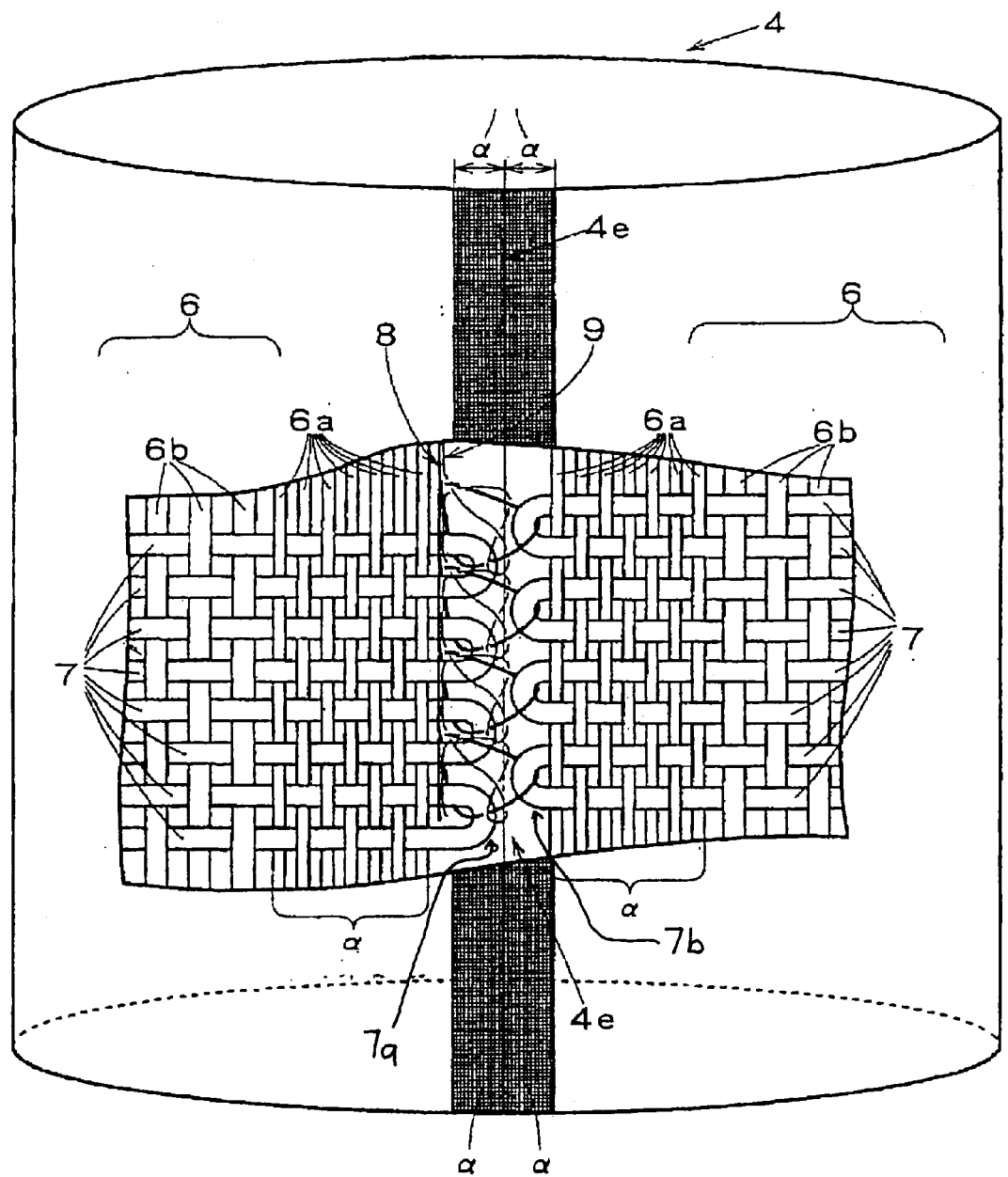
FIG. 2(a) is a schematic view of the cover of the air belt shown in FIG. 1.

As shown in a schematic expanded view in a central part of FIG. 2(a), the tube-like mesh cover 4 is formed from warp yarn 6 and weft yarn 7 alternately woven together. The mesh cover 4 may be woven by using a weaving method other than plain weaving.

The weft yarn 7 is bent in an opposite direction in sections having a given length so that the weft yarn meanders. Bent parts 7a formed at ends of the sections of the weft yarn 7, each section having the given length are connected to bent parts 7b formed at the other ends of the sections of the weft yarn 7 by being entangled with a primary entanglement-thread 8, whereby the mesh cover 4 is woven as a tube. At each intersection between the yarns shown in the drawing, when one of the yarns is shown continuous and the other yarn is shown discontinuous, the yarn shown continuous is positioned at the front side of the other yarn shown discontinuous.

Figure 2B:
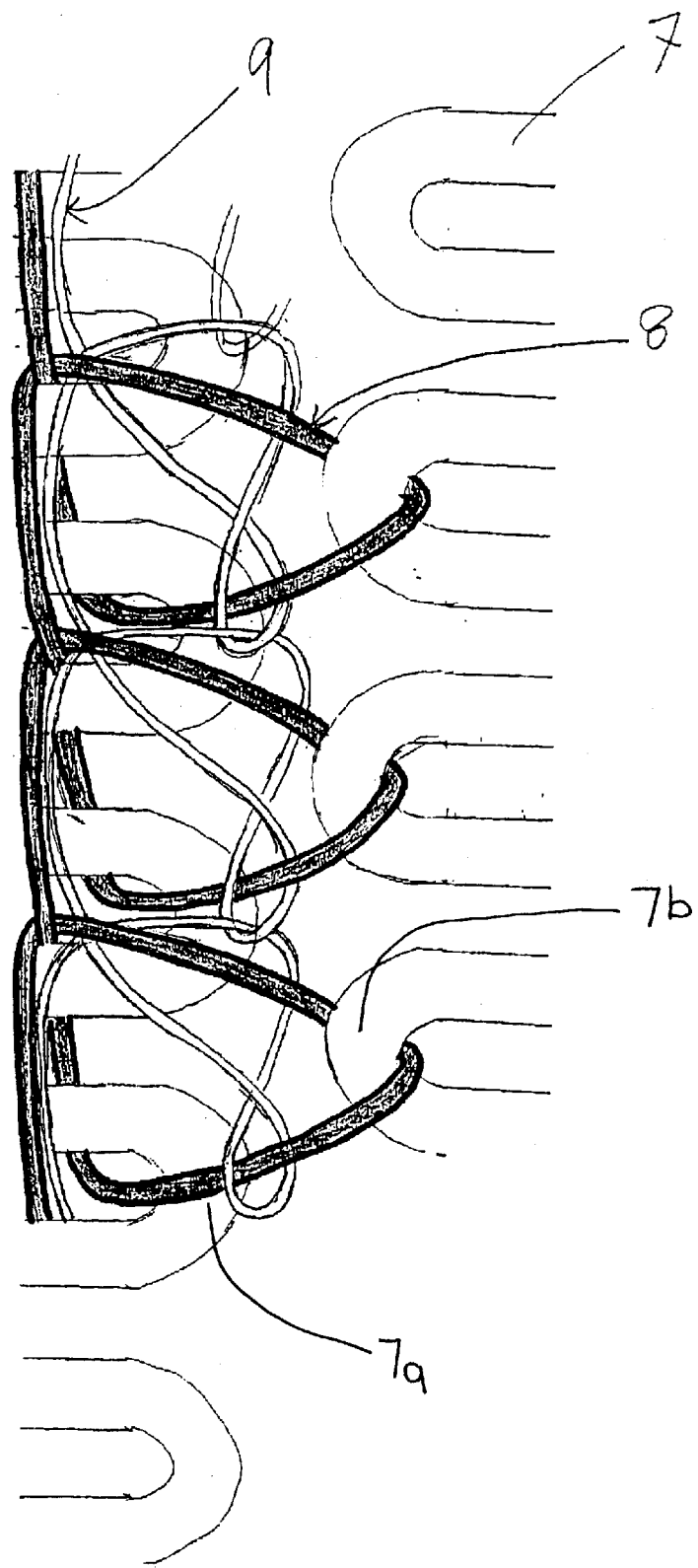
FIG. 2(b) is a close-up schematic view of the entangled-connected part or seam.
Figure 3:
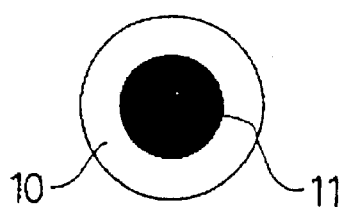
FIG. 3 is a cross-sectional view of a heat-fusion yarn used as a warp yarn and/or a weft yarn of the cover shown in FIG. 2.

As shown in FIG. 2(b), the weft yarn 7 is entangled with the primary entanglement-thread 8 in such a manner that the primary entanglement-thread 8 extends upward at the front side of two sections of the weft yarn 7 in the drawing, is bent toward the right downward, is entangled with the bent part 7b disposed between the two sections of the weft yarn 7 so as to be entangled from the rear side of the bent part 7b to the front side thereof, is bent to the left downward, is entangled with the bent part 7a of the weft yarn 7 disposed directly under the bent part 7b so as to be entangled from the front side of the bent part 7a to the rear side thereof, extends upward at the rear side of the above-described two sections of the weft yarn 7, is entangled with the bent part of the primary entanglement-thread 8 toward the right downward, as described above, from the front side of the bent part, and extends upward, in the same manner as described above, at the front side of the adjacent two sections of the weft yarn 7. By repeatedly performing the above entanglement, the primary entanglement-thread 8 is entangled with the weft yarn 7. The weft yarn 7 and the entanglement-thread 8 may be entangled with each other in a manner other than that shown in the drawing.

The strength of the primary entanglement-thread 8 is set to a value at which the primary entanglement-thread 8 can be relatively easily broken by an expansive force produced when the bag 3 and the mesh webbing 2 expand. According to the present embodiment, a secondary entanglement-thread 9 is provided which is entangled with the primary entanglement-thread 8 and is not entangled with the bent parts 7a and 7b of the weft yarn 7. That is, the bent parts 7a and 7b of the weft yarn 7 are only connected to each other via the primary entanglement-thread 8. The second entanglement-thread 9 serves to prevent the warp yarn from raveling. The secondary entanglement-thread 9 may be omitted.

The mesh cover 4 formed into a tube is provided with an entangled-connected part 4e formed with the primary entanglement-thread 8. However, since right and left hems of the cloth forming the mesh cover 4 are not sewn together with a sewing thread 5a, as in the known cover, a sewn part 5 is not formed (see FIG. 5(a)). Folded parts of the right and left hems 4a and 4b of the mesh cover 4 are also not formed, as in the known cover shown in FIG. 5(a). The connection between the hems shown in FIG. 2 may be referred to as a seam.

Five to ten warp yarns 6a (seven in the drawing) having a small denier (for example, 150 deniers) may be used as the warp yarn 6 at both sides of the entangled-connected part 4e. That is, small-denier-warp regions α are formed in respective predetermined regions of the mesh cover 4 with the entangled-connected part 4e therebetween. Warp yarns 6b having a standard denier (for example, 500 deniers) the same as that of the known cover are used as the warp yarn in a region other than the small-denier-warp regions α. The weft yarn 7 has a denier larger than the ordinary denier of the warp yarn 6 (for example, 750 deniers). The weft yarn 7 may have a denier equal to or smaller than the standard denier of the warp yarn 6.

The predetermined regions including the entangled-connected part 4e are made softer than the other region by virtue of the small-denier-warp regions α, whereby a soft sensation is provided at hems toward the entangled-connected part 4e of the mesh cover 4. Therefore, when the mesh cover 4 in a normal state of seat belt application is brought into contact with the passenger at the hems providing a soft sensation, thereby suppressing the uncomfortable sensation of the passenger. The small-denier-warp region α may be formed only at one side of the entangled-connected part 4e.

In the cloth shown in a center of FIG. 2 in schematic and enlarged view, the thickness of each yarn and thread is shown in an enlarged scale for clear description.

Heat-fusion yarn may be used as the warp yarn 6 and the weft yarn 7. The heat-fusion yarn is formed such that a normal polyester yarn 10 is coated with a low-melting-point polyester layer 11 at the outer face of the polyester yarn 10. The mesh cover 4 woven in a shape of a tube is heat-treated, whereby the low-melting-point polyester layers 11 of the warp yarn 6 and the weft yarn 7 are melted and serves as an adhesive between the adjacent yarns. The adjacent portions of the warp yarn 6, the adjacent portions of the weft yarn 7, and the warp yarn 6 and the weft yarn 7 at intersections thereof adhere to each other such that a ravel of each yarn is not produced. As mentioned above, heatfusion yarn may be used as one of the warp yarn 6 and the weft yarn 7.

Preferably, the heat-fusion yarn is used as the weft yarn 7 so that the warp yarn 6 and the weft yarn 7 adhere to each other. Whereby the warp yarn 6 is prevented from displacement when the air belt 1 slides on a belt guide when drawing or spooling the air belt 1 being in a normal non-expanded state.

The air belt 1 is provided at the overall seat belt or a part of the seat belt at which expansion is required, such as a shoulder belt part or a lap belt part.

The air belt 1 may be used in the inflatable seat belt device disclosed in the above-described publication or any inflatable seat belt device to which the air belt 1 can be applied. The description of the inflatable seat belt device can be easily understood when referring to the above-mentioned publication and other literatures on known technologies concerning the inflatable seat belt device.

Figure 4:
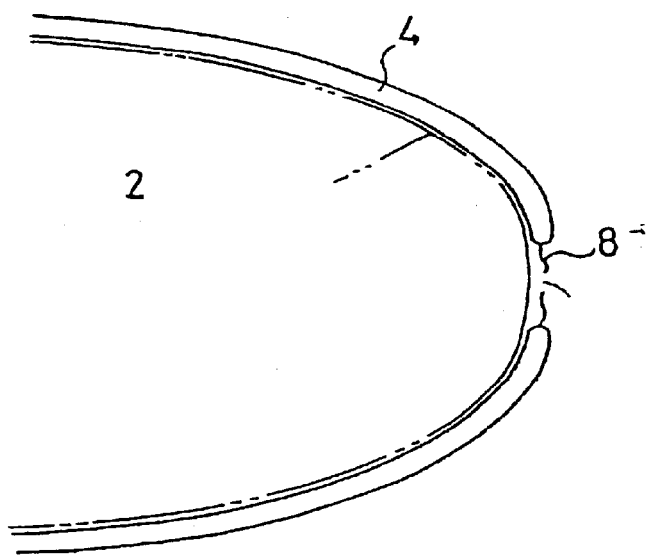
FIG. 4 is an explanatory illustration of a state in which the cover is extending when the air belt shown in FIG. 1 is inflated.

In the air belt 1 for an inflatable seat belt device, according to the present invention, when the bag 3 is inflated with gas supplied from an inflator (corresponding to the gas generating means according to the present invention) in an emergency, the mesh webbing 2 and the mesh cover 4 expand. In this case, the expansive force immediately increases to exceed a given value, and the primary entanglement-thread 8 of the entangled-connected part 4e of the tube-like mesh cover 4 breaks due to the expansive force, as shown in FIG. 4. Therefore, the mesh cover 4 extends widely, whereby the mesh webbing 2 and the bag 3 expand quickly to the maximum extent possible, whereby the mesh webbing 2 receives the kinetic energy of the passenger in the same manner as in the known air belt but over a larger area so as to disperse the load.

Therefore, the load which the passenger receives becomes relatively small, whereby the passenger is protected more effectively.

Figure 5:
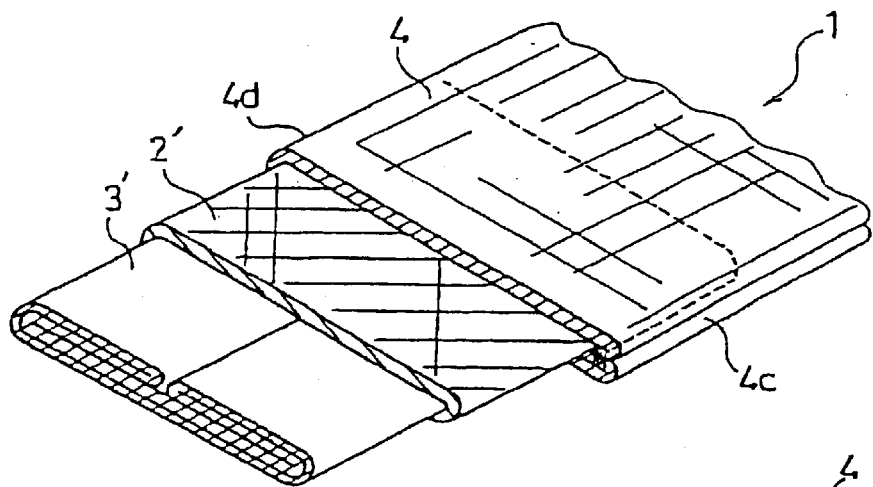
FIG. 5(a) is a perspective view of a part of a known air belt which is shape-retained as a belt in an ordinary state.
FIG. 5(b) is an illustration of a hem of a cover of the known air belt shown in FIG. 5(a).
FIG. 5(c) is an explanatory illustration of a state in which the cover is extending when the air belt is inflated.
Figure 5B:
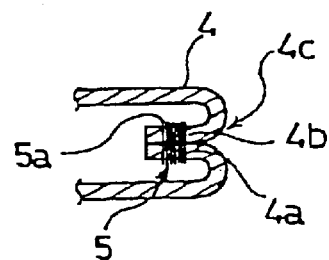
Figure 5C:
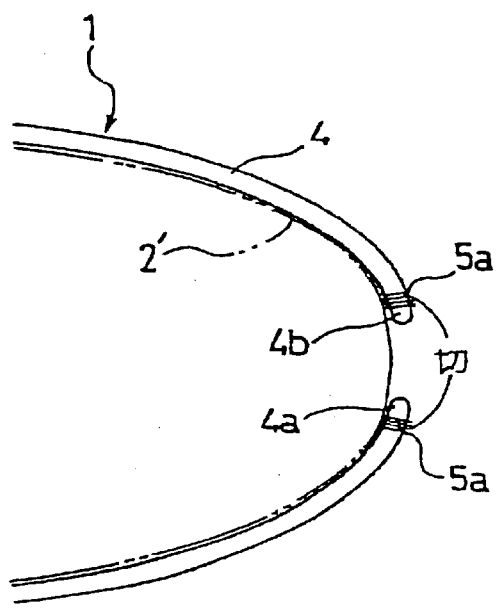

The air belt 1 for an inflatable seat belt device, according to the present embodiment, is not provided with the folds and the sewn part 4 of the right and left hems of the cloth, as shown in FIGS. 5(a)–5(c). As a result, the thickness of the hem 4c of the entangled-connected part side of the air belt 1 is prevented from increasing. Therefore, the thickness of the mesh cover 4 can be greater in the width direction, thereby preventing the passenger from an uncomfortable sensation when applying a seat belt.

The folds and the sewn part 4 of the right and left hems of the cloth are not provided, as in the known example. Therefore, the bending strength of the mesh cover 4 at the hem 4c at the entangled-connected part side can be made substantially the same as that at the hem 4d opposite to the hem 4c, thereby more effectively preventing the passenger from an uncomfortable sensation when handling or applying the seat belt.

The cover 3 is formed as a tube by weaving the weft yarn 7 with the primary tangling thread 8. As the thickness and the bending strength of the cover are reduced by eliminating the sewn part, the air belt 1 can smoothly slide through a guide hole of the belt guide. Winding and unwinding of the belt can be performed smoothly. In particular, the air belt 1 can be spooled directly to a retractor because the thickness of the cover 4 can be reduced.

The small-denier-warp region is provided on at least one side of the entangled-connected part 4e of the mesh cover 4. The denier of the warp yarn disposed in the small-denier-warp region is set to a value smaller than that of the standard denier of the warp yarn disposed in the other region. As a result, the hem 4c at the side of the entangled-connected part 4e of the mesh cover 4 can provide a soft sensation, whereby a user of the seat belt is prevented from having an uncomfortable sensation when touching the hem 4c of the mesh cover 4.

Heat-fusion yarn may be used as at least one of the warp yarn 6 and the weft yarn 7 so that the yarns adhere to each other, thereby suppressing ravels of the yarn when the mesh cover 4 extends. In particular, by using the heat-fusion yarn as the weft yarn 7 such that the warp yarn 6 and the weft yarn 7 adhere to each other, the displacement of the warp yarn 6 can be avoided. The displacement typically produced in conventional belts when the air belt 1 slides on a belt guide when winding and unwinding the air belt 1 which is in an ordinary non-expanded state.

Although in the air belt 1 according to the embodiment described above, the mesh cover 4 is formed as a tube by weaving with the primary entanglement-thread 8, the mesh cover 4 may also be formed in such a manner that a rectangular cloth is woven with the warp yarn 6 and the weft yarn 7 and the rectangular cloth is bent as a cylinder, of which both hems are entangled and connected to each other by using the primary entanglement-thread 8. However, the number of man-hours required is high for such a construction. The mesh cover 4 is preferably formed directly into a tube, as in the case of the embodiment described above.

As described above, the air belt for an inflatable seat belt device, according to the present invention, not only functions as a seat belt which restrains a passenger in the same fashion as a known general seat belt device, but also reliably functions as an air belt which receives the kinetic energy of the passenger at a larger area, thereby protecting the passenger from a large impact.

The air belt according to the present invention is not provided with folds and a sewed part of the right and left hems of the cover, as in a known air belt, whereby the thickness of the hems at the side at which the weft yarn is connected by a entanglement-thread can be prevented from being increased. With this arrangement, the thickness of the cover can be made more even in the width direction, thereby preventing the passenger from having an uncomfortable sensation when using the seat belt.

Since the air belt is not provided with folds and a sewed part of the right and left hems, as in the known air belt, the bending strength of the cover at the side at which the weft yarn is connected by the entanglement-thread and at the opposite side can be made substantially uniform, whereby the passenger can be prevented from having an uncomfortable sensation when applying and using the seat belt.

Since the thickness of the cover of the air belt can be made more even and the bending strength thereof at the right and left hems can be made substantially uniform, thereby suppressing the uncomfortable sensation of the passenger and improving sensation when using the seat belt.

Since the thickness of the cover and the bending strength thereof can be reduced by eliminating the sewed part, the air belt 1 can smoothly slide through a guide hole of a belt guide, whereby the belt can be wound and unwound smoothly. Since the thickness of the cover can be reduced, the air belt can be wound directly to a retractor.

In particular, a small-denier-warp region is provided in a region at least one side of an entangled-connected part of the cover, whereby a soft sensation can be provided by the hem at the entangled-connected part of the cover, thereby preventing a passenger from having an uncomfortable sensation when touching the hem of the cover.

According to the present invention, the warp yarn and the weft yarn adhere to each other with a heat-fusion yarn being used as at least one of the warp yarn and the weft yarn, whereby the ravels of the yarns can be suppressed when the cover extends. When the heat-fusion yarn is used as the weft yarn so that the warp yarn and the weft yarn adhere to each other, the ravel of the warp yarn when the air belt in an ordinary non-expanded state is unwound or wound can be avoided, the ravel being produced with the air belt sliding on a belt guide.

The priority applications Japanese Patent Application No. 2000-380323 filed Dec. 14, 2000 is hereby incorporated by reference herein in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An air belt for an inflatable seat belt device, comprising:
    a bag capable of expanding when gas is introduced into the bag; and
    a cover for the bag,
    wherein the cover comprises a cloth woven with warp yarn and weft yarn and formed into a tube by connecting the weft yarn at hems of the cloth with an entanglement-thread wherein the entanglement-thread is configured to be broken by an expansive force produced when the bag expands, thereby causing the cover to extend so that the bag expands further; and
    wherein a small-denier-warp region is formed on at least one side of the hems of the cloth, the small-denier-warp region including warp yarn having a denier smaller than that of the warp yarn disposed in a region other than the small-denier-warp region.

2. The air belt of claim 1, further comprising a mesh webbing surrounding the bag and being covered by the cover, wherein the mesh webbing is capable of expanding according to the expansion of the bag.

3. The air belt of claim 1, further comprising a second entanglement thread entangled with the first mentioned entanglement thread.

4. The air belt of claim 1, wherein the cover is tube shaped.

5. The air belt of claim 1, wherein a heat-fusion yarn is used as at least one of the warp yarn and the weft yarn.

6. The air belt of claim 1, wherein the small-denier-warp-region is located on both sides of the hems.

7. The air belt for an inflatable seat belt device comprising:
    a bag capable of expanding when gas is introduced into the bag; and
    a cover for the bag,
    wherein the cover comprises a cloth woven with warp yarn and weft yarn and formed into a tube by connecting the weft yarn at hems of the cloth with an entanglement-thread, wherein the entanglement-thread is configured to be broken by an expansive force produced when the bag expands, thereby causing the cover to extend so that the bag expands further; and
    wherein a heat-fusion yarn is used as at least one of the warp yarn and the weft yarn.

8. The air belt of claim 7, wherein a small-denier-warp region is formed on at least one side of the hems of the cloth, the small-denier-warp region including warp yarn having a denier smaller than that of the warp yarn disposed in a region other than the small-denier-warp region.

9. The air belt of claim 8, wherein the small-denier-warp-region is located on both sides of the hems.

10. The air belt of claim 7, further comprising a mesh webbing surrounding the bag and being covered by the cover, wherein the mesh webbing is capable of expanding according to the expansion of the bag.

11. The air belt of claim 7, further comprising a second entanglement thread entangled with the first mentioned entanglement thread.

12. The air belt of claim 7, wherein the cover is tube shaped.

* * * * *